J. B. HOAGLAND.
BRAKE BEAM.
APPLICATION FILED MAY 9, 1910.
974,270.
Patented Nov. 1, 1910.
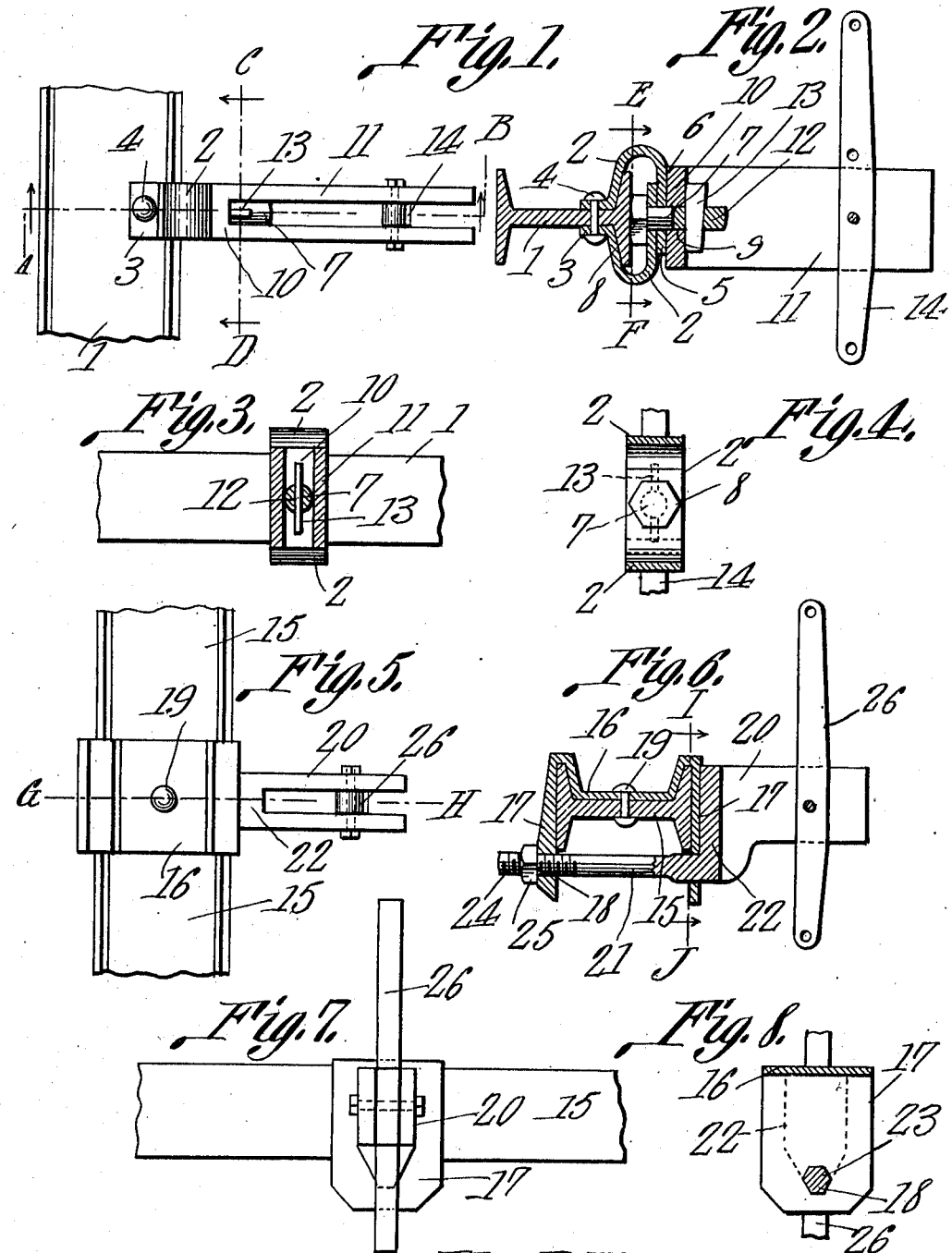
Witnesses
John B. Hoagland, Inventor
by C. A. Snow & Co.
Attorneys

UNITED STATES PATENT OFFICE.

JOHN B. HOAGLAND, OF ST. LOUIS, MISSOURI, ASSIGNOR OF ONE-HALF TO THEODORE B. AUFRICHT, OF ST. LOUIS, MISSOURI.

BRAKE-BEAM.

974,270.  Specification of Letters Patent.  Patented Nov. 1, 1910.

Application filed May 9, 1910. Serial No. 560,122.

*To all whom it may concern:*

Be it known that I, JOHN B. HOAGLAND, a citizen of the United States, residing at St. Louis, in the State of Missouri, have invented a new and useful Brake-Beam, of which the following is a specification.

This invention relates to brake beams for use upon railway cars and the like and its object is to provide means for connecting the brake lever to the beam and holding said lever so as to work in any plane desired relative to the upper and lower faces of the beam.

With these and other objects in view the invention consists of certain novel details of construction and combinations of parts hereinafter more fully described and pointed out in the claims.

In the accompanying drawings the preferred forms of the invention have been shown.

In said drawings:—Figure 1 is a plan view of a portion of a brake beam having the present improvements applied thereto. Fig. 2 is a section on line A—B Fig. 1. Fig. 3 is a section on line C—D Fig. 1. Fig. 4 is a section on line E—F Fig. 2. Fig. 5 is a plan view of a portion of a brake beam having a modified form of attachment. Fig. 6 is a section on line G—H Fig. 5. Fig. 7 is an end elevation of the parts shown in Fig. 5. Fig. 8 is a section on line I—J Fig. 6.

Referring to the figures by characters of reference 1 designates an I-beam constituting the brake beam to which the shoes are connected and a stirrup is secured to the middle portion of the beam 1 and consists of oppositely disposed U-shaped straps or brackets 2 having terminal ears 3 at one end which bear upon opposite faces of the web of the beam and are secured thereto by a rivet 4 or the like. The other ends of the brackets lap, as shown at 5 and have registering openings 6 for the reception of a bolt 7. The head 8 of this bolt is interposed between the beam 1 and the lapping ends of the brackets while the intermediate portion of the bolt extends through an opening 9 formed in the head 10 of a fork 11. A slot 12 is formed within that portion of the bolt projecting into the fork and is adapted to receive a key 13 whereby the bolt may be securely fastened to the fork. A brake lever 14 is fulcrumed within the fork 11 and is adapted to be attached to the usual brake rods.

It will be seen that by connecting the fork 11 to the stirrup in the manner described, the said fork can be swung upon the bolt 7 so as to assume any desired position relative to the beam and thus hold the lever 14 so as to swing either in a vertical, a horizontal or an inclined plane. Moreover the parts can be thus reversed so that the lever can be changed to either a right hand or a left hand lever.

Instead of constructing and arranging the parts as shown in Figs. 1 to 4 inclusive, the said parts may be constructed as shown in Figs. 5 to 8 inclusive wherein the beam 15 has a stirrup 16 fitted snugly upon the web and upper flanges thereof and having its terminals 17 extending downwardly below the beam and each formed with an angular opening 18. This stirrup may be secured to the beam 15 by a rivet 19 or the like and which serves to prevent the stirrup from slipping upon the beam. A fork 20 projects beyond the I-beam and has a stem 21 extending from the head 22 thereof, this stem having an angular portion 23 adapted to fit snugly in one of the openings 18. The free end portion of the stem is screw-threaded as shown at 24 and is adapted to project into the other opening 18 and to be engaged by a nut 25 or the like whereby the head 22 can be tightly clamped against one end portion of the stirrup. A brake lever 26 is fulcrumed within the fork 20 and is adapted to be connected to the usual brake rod. It will be apparent that with this construction the stem 21 can be partly or entirely withdrawn from the openings 18 and then rotated so as to bring the lever 26 with its side faces either in vertical or inclined planes and by then reinserting and tightening the stem 21 the fork and lever will be held in the positions to which they are shifted. It will be seen also that this modified form of the device can be reversed so as to form either a right hand or a left hand lever.

Various changes can of course be made in the construction and arrangement of the parts without departing from the spirit or sacrificing any of the advantages of the invention as defined in the appended claims.

What is claimed is:—

1. The combination with a brake beam, of a stirrup secured thereto and having its terminal portions projecting beyond one face thereof, said terminals having openings, one of the openings being angular, a fork, a stem extending therefrom and retained within the openings, and means engaging the stem for binding the fork against the stirrup and binding said stirrup upon the beam.

2. The combination with a beam, of a stirrup secured thereto and embracing the same, said stirrup having apertured terminal portions projecting beyond the beam, a fork, a stem projecting therefrom and reversibly mounted within the openings in the terminal portions, said stem and the walls of one of the openings coöperating to hold the stem against rotation, and means engaging the stem for clamping the fork against the stirrup and binding said stirrup upon the beam.

3. The combination with a beam, of a stirrup secured thereto and having its free terminals projecting therebeyond, said terminals having openings therein, a fork, and means removably mounted within the openings and engaging the fork for binding said fork upon the stirrup.

In testimony that I claim the foregoing as my own, I have hereto affixed my signature in the presence of two witnesses.

JOHN B. HOAGLAND.

Witnesses:
 OSCAR BLEYNK,
 M. J. MURPHY.